(12) United States Patent
Bai et al.

(10) Patent No.: US 9,112,608 B2
(45) Date of Patent: Aug. 18, 2015

(54) RESOURCE-EFFICIENT DIGITAL CHROMATIC DISPERSION COMPENSATION IN FIBER OPTICAL COMMUNICATION USING SPECTRAL SHAPING SUBCARRIER MODULATION

(71) Applicant: Futurewei Technologies, Inc., Plano, TX (US)

(72) Inventors: Yu Sheng Bai, Los Altos Hills, CA (US); Yanjun Zhu, San Jose, CA (US); Qing Guo, Dublin, CA (US); Yan Cui, Sunnyvale, CA (US); Fei Zhu, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 12 days.

(21) Appl. No.: 14/048,949

(22) Filed: Oct. 8, 2013

(65) Prior Publication Data

US 2014/0099116 A1  Apr. 10, 2014

Related U.S. Application Data

(60) Provisional application No. 61/711,010, filed on Oct. 8, 2012.

(51) Int. Cl.
*H04B 10/2513* (2013.01)
*H04B 10/532* (2013.01)
(Continued)

(52) U.S. Cl.
CPC ........ *H04B 10/25137* (2013.01); *H04B 10/532* (2013.01); *H04B 10/58* (2013.01); *H04B 10/6161* (2013.01); *H04J 14/00* (2013.01); *H04J 14/06* (2013.01)

(58) Field of Classification Search
CPC ........ H04B 10/40; H04B 10/43; H04B 10/50; H04B 10/503; H04B 10/506; H04B 10/60; H04B 10/6161; H04B 10/532; H04B 10/58; H04B 10/25137; H04J 14/00; H04J 14/0298; H04J 14/06; H04J 2011/00; H04J 2011/003; H04J 2011/0009
See application file for complete search history.

(56) References Cited

U.S. PATENT DOCUMENTS 5,745,275 A * 4/1998 Giles et al. ...................... 398/94
7,693,429 B1   4/2010 Lowery
(Continued)

FOREIGN PATENT DOCUMENTS

EP   2066044 A1   6/2009

OTHER PUBLICATIONS

Xiang, L., et al., "448-Gb/s Reduced-Guard-Interval CO-OFDM Transmission Over 2000 km of Ultra-Large-Area Fiber and Five 80-GHz-Grid ROADMs," Journal of Lightwave Technology, vol. 29, No. 4, Feb. 15, 2011, pp. 483-490.
Savory, S., J., et al., "Digital Filters for Coherent Optical Receivers," Optical Networks Group, Dept. of Electronic & Electrical Engineering, Optics Express, vol. 16, No. 2, Jan. 21, 2008, pp. 804-817.
Foreign Communication from a Counterpart Application, PCT Application No. PCT/US2013/063910, International Search Report dated Jan. 27, 2014, 5 pages.
(Continued)

*Primary Examiner* — Darren E Wolf
(74) *Attorney, Agent, or Firm* — Conley Rose, P.C.; Grant Rodolph; Jonathan K. Pok

(57) ABSTRACT

An optical receiver comprising a frontend configured to receive an optical signal and convert the optical signal into a plurality of digital electrical signals comprising a plurality of spectrally shaped subcarrier signals carrying symbol mapped data information, and a digital signal processor (DSP) unit coupled to the frontend and configured to receive the digital signals from the frontend, demulitplex the digital signals into the subcarrier signals, and compensate chromatic dispersion (CD) for each of the subcarrier signals by applying an equalizer, wherein each of the subcarrier signals is associated with a unique tone frequency and a unique spectral shape. Also disclosed is an optical transmitter comprising a digital signal processor (DSP) unit configured to map data symbols onto a plurality of electrical subcarrier signals that are non-overlapping and spectrally shaped in a frequency domain.

26 Claims, 9 Drawing Sheets

(51) Int. Cl.
*H04B 10/58* (2013.01)
*H04B 10/61* (2013.01)
*H04J 14/00* (2006.01)
*H04J 14/06* (2006.01)

(56) References Cited

U.S. PATENT DOCUMENTS

| | | |
|---|---|---|
| 2002/0012152 A1* | 1/2002 | Agazzi et al. ............... 359/189 |
| 2004/0067064 A1* | 4/2004 | McNicol et al. ............. 398/158 |
| 2009/0232253 A1* | 9/2009 | Letunov et al. .............. 375/298 |
| 2010/0329683 A1 | 12/2010 | Liu |
| 2011/0176815 A1 | 7/2011 | Frankel et al. |
| 2011/0182577 A1* | 7/2011 | Wu .................................. 398/52 |
| 2011/0255870 A1 | 10/2011 | Grigoryan et al. |

OTHER PUBLICATIONS

Foreign Communication from a Counterpart Application, PCT Application No. PCT/US2013/063910, Written Opinion dated Jan. 27, 2014, 7 pages.

Waldhauser, D., S., et al., "Comparison of Filter Bank Based Multicarrier Systems with OFDM," IEEE Asia Pacific Conference on Circuits and Systems, APCCAS 2006, Dec. 1, 2006, pp. 976-979.

Geyer, J.C., et al., "Efficient Frequency Domain Chromatic Dispersion Compensation in a Coherent Polmux QPSK-Receiver," Conference on Optical Fiber Communication (OFC) Collocated National Fiber Optic Engineers Conference, XP031677273, Mar. 21, 2010, 3 pages.

"OFDM and Multi-Channel Communication Systems," National Instruments, Feb. 2, 2012, 8 pages.

* cited by examiner

| | SINGLE CARRIER NYQUIST | 4-SUBCARRIER NYQUIST |
|---|---|---|
| M-SUBCARRIER | 1 | 4 |
| SYMBOL RATE | 30 Gbaud | 7.5 Gbaud (=30/4) |
| CD FOR 1500km SSMF | 27ns/nm (USE D=18ps/nm-km FOR SSMF) | |
| N-POINT COMPLEX DFT | 1024 | 64 (=1024/16) |
| REAL MULTIPLICATIONS | 10248 | 4x264 |
| REAL ADDITIONS | 30728 | 4x1032 |

| N-POINT COMPLEX DFT | COMPUTATIONS USING SPLIT RADIX ||
| --- | --- | --- |
| | REAL MULTIPLICATIONS | REAL ADDITIONS |
| 1024 | 7172 | 27652 |
| 4x64 | 4x196 | 4x964 | under# RESOURCE-EFFICIENT DIGITAL CHROMATIC DISPERSION COMPENSATION IN FIBER OPTICAL COMMUNICATION USING SPECTRAL SHAPING SUBCARRIER MODULATION

CROSS-REFERENCE TO RELATED APPLICATIONS

The present application claims priority to U.S. Provisional Patent Application 61/711,010, filed Oct. 8, 2012 by Yu Sheng Bai, et. al., and entitled "Method and Apparatus of Using Subcarrier Nyquist-WDM for Computation-Efficient Digital Chromatic Dispersion Compensation in Fiber Optical Communications", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Optical communication systems are widely used for data communication. Optical communication systems may employ optical fibers as the transmission medium to support high data rates in long distance transmissions (e.g. long haul optical systems). Some of the limiting factors for fiber performance at long distances are signal distortions due to fiber impairments, such as chromatic dispersion (CD), polarized mode dispersion (PMD), phase noise, and non-linear effects, etc. Recent advances in high speed analog-to-digital and/or digital-to-analog converters (ADCs and/or DACs) and deep submicron semiconductor processing technologies may enable the realization of very large scale ASIC (Application Specific Integrated Circuit) digital signal processors (DSPs). Such ASIC DSPs may comprise several tens or even hundreds of millions of gates, which may be required for performing advanced digital signal processing to compensate for signal distortions at a high data throughput (e.g. more than trillion bits per second for 100 Gigabit Ethernet (100-GE) signal). Such Very Large Scale Integrated (VLSI) circuits may consume high power, despite of using deep submicron processing technologies, such as 32 or 28 nanometers (nm). With the rising demand for "bandwidth anywhere anytime" requiring increasing data rates, such as 400 gigabits (G) or 1 terabit (T), the need for DSP processing power and hardware resources may increase significantly, thus posing a great concern in power consumption. Many efforts have been devoted to reducing the complexity of digital signal processing circuits, in particular, the size of equalizers that may be used for compensation of signal distortions.

SUMMARY

In one embodiment, the disclosure includes an optical transmitter comprising a DSP unit configured to map data symbols onto a plurality of electrical subcarrier signals that are non-overlapping in a frequency domain, perform spectral shaping on each of the subcarrier signals, and combine the subcarrier signals into a combined output signal, and a frontend coupled to the DSP unit and configured to convert the combined output signal into an optical signal and transmit the optical signal, wherein each of the subcarrier signals is associated with a unique tone frequency and a unique spectral shape.

In another embodiment, the disclosure includes an optical receiver comprising a frontend configured to receive an optical signal and convert the optical signal into a plurality of digital electrical signals comprising a plurality of spectrally-shaped-subcarrier signals carrying symbol mapped data information, and a DSP unit coupled to the frontend and configured to receive the digital signals from the frontend, demulitplex the digital signals into the subcarrier signals, and compensate CD for each of the subcarrier signals, wherein each of the subcarrier signals is associated with a unique tone frequency and a unique spectral shape.

In yet another embodiment, the disclosure includes a method for compensating for CD in an optical fiber communication system comprising receiving a plurality of digital signals comprising symbol mapped data information carried in a plurality of spectrally shaped subcarrier signals, demulitplexing the digital signals into the subcarrier signals, and performing a frequency domain equalization on each subcarrier signal.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
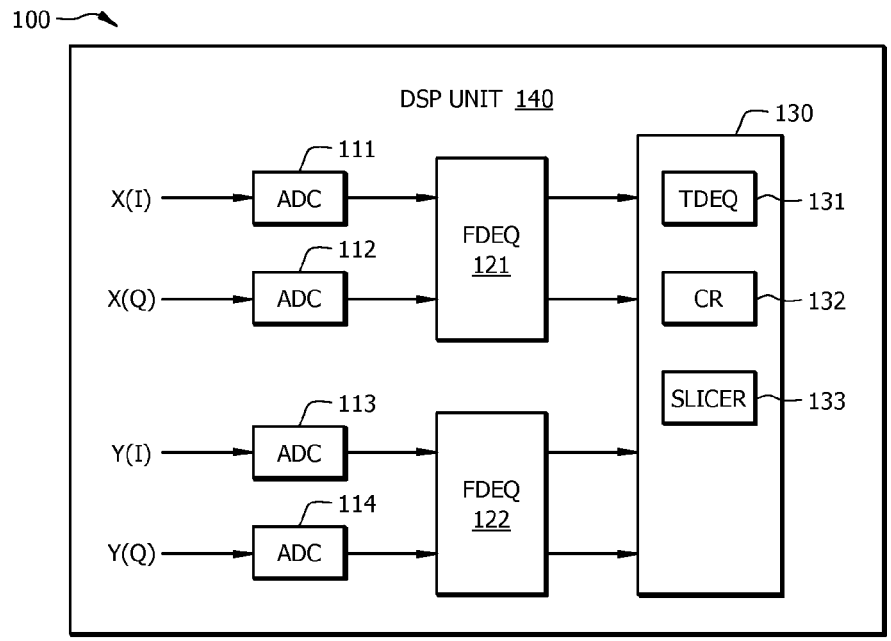
FIG. 1 is a schematic diagram of an embodiment of a DSP-based dual polarization coherent receiver.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In optical communication systems, the CD of light signals propagating over long distances in optical media such as optical fibers may be a significant linear impairment in an optical fiber transmission system. CD is the effect of different spectral components (e.g. wavelengths) in a light beam traveling through an optical fiber with different speeds and arriving at a receiver at different time instants. CD may result in pulse distortions, such as pulse broadening, and may lead to inter-symbol interference (ISI) with increased bit error rate (BER). The effect of CD may become more pronounced at higher data rates (e.g. more detrimental to 100 gigabits per second (Gbps) signal than to 40 Gbps signal with the same symbol mapping rule). In order to meet the growing demand for higher transmission capacity in optical communication systems, data streams may be modulated using multiple polarizations (e.g. X-polarization and Y-polarization). Polarization components may propagate through an optical fiber with different speeds and may arrive at a receiver at different time instants, which may cause pulse distortions. This effect is known as PMD, which may increase ISI and BER.

Both CD and PMD may be compensated in the optical and/or electrical domains. Advanced DSP techniques in the electrical domain may offer an efficient and cost effective alternative to traditional optical compensation techniques for impairments equalization. The availability of high speed ADCs and deep submicron semiconductor technologies may allow dispersion compensation to be performed digitally. Both CD and PMD may be compensated digitally in either the time domain or the frequency domain by applying a time domain equalizer (TDEQ) or an FDEQ, respectively. An FDEQ may be computationally more efficient than a TDEQ when the size of an equalizer is large (e.g. long taps). However, a TDEQ may adapt equalizer tap coefficients at a faster rate. CD may be slow varying or almost constant for a given transmission link (e.g. with fixed fiber type and fiber length). However, a large equalizer may be required to compensate CD at long distances. As such, CD may be compensated efficiently by employing an FDEQ. On the other hand, PMD may be fast varying and TDEQ may be effectively employed to adapt to PMD's quick transients. In an embodiment, an FDEQ may comprise an N-point Fast Fourier Transform (FFT) unit, an N-tap CD compensation (CDC) equalizer, and an N-point Inverse Fast Fourier Transform (IFFT) unit. The size of an FDEQ (e.g. the value N) may be determined based on the amount of CD for which compensation is desired. Since CD increases with optical fiber lengths, the size of an FDEQ may increase with transmission distances.

In a data communication system, data information bits may be mapped to symbols according to a desired coding rule. For example, a Quadrature Phase Shift Keying (QPSK) coding may map 2 data bits to a symbol, and a polarized multiplexed-Quadrature Phase Shift Keying (PM-QPSK) coding may map 4 data bits to a symbol. Symbol rate may refer to a rate at which the mapped data symbols may be transmitted (e.g. number of data symbols per second).

Disclosed herein is a mechanism to compensate CD at a lower symbol rate by employing a multiple (m) spectrally-shaped subcarrier modulation transmission system. An m-subcarrier modulation transmission system may modulate data information onto m subcarriers at a lower symbol rate (Rsc) to achieve the same data rate as a single carrier transmission system operating at a higher symbol rate (Rs), where Rsc=Rs/m. In an embodiment, an FDEQ comprising an N-point FFT unit, an N-tap CDC equalizer, and an N-point IFFT unit may be employed to compensate for CD. The computational complexity of an N-point FFT may be about $N \times \log_2(N)$, where N is the number points in the FFT and IFFT. Since CD tolerance may be inversely proportional to the square of the symbol rate, the size of the FDEQ may be reduced by a factor of $m^2$ when the symbol rate is reduced by a factor of m. As such, the computational complexity for a Nyquist m-subcarrier modulation based FDEQ may be proportional to about $(N/m) \times \log_2(N/m^2)$. In an example embodiment, the computational complexity may be reduced by a factor of about seven to about nine when reducing the symbol rate by a factor of about four by employing about four subcarriers instead of a single carrier. The savings in hardware resources in terms of gate counts for logics and memory may be in about the same order. Since an FDEQ may consume as much as about forty percent of total DSP resources for baseband processing, the reduction in FDEQ hardware from a lower symbol rate may result in significant hardware cost and/or space savings. The Nyquist m-subcarrier modulation based FDEQ may be employed at a transmitter to pre-compensate for CD prior to transmission and/or at a receiver to compensate CD resulting from transmission over an optical fiber channel. In another embodiment, a Nyquist m-subcarrier modulation transmitter and/or receiver may employ the same electrical and optical frontends as a single carrier transmitter and/or receiver, respectively.

FIG. 1 is a schematic diagram of an embodiment of a DSP-based dual polarization coherent receiver 100, which may receive a single optical carrier signal. The DSP-based dual polarization coherent receiver 100 may comprise a DSP unit 140 comprising a plurality of ADCs 111, 112, 113, and 114, a first FDEQ 121, a second FDEQ 122, and a time domain processing unit 130. The DSP unit 140 may be referred to simply as a DSP, and the DSP unit 140 may comprise an application specific integrated circuit (ASIC) DSP. The ADCs 111, 112, 113, and 114 may be on-chip as shown in the DSP-based dual polarization coherent receiver 100 or off-chip. Each FDEQ 121 or 122 may be coupled to some of the ADCs 111, 112, 113, 114, and to the time domain processing unit 130. For example, the first FDEQ 121 may be coupled to the ADCs 111 and 112, and the second FDEQ 122 may be coupled to the ADCs 113 and 114. The first FDEQ 121, second FDEQ 122, and the time domain processing unit 130 may be realized in hardware and/or implemented as DSP software components.

The DSP-based dual polarization coherent receiver 100 may be any device that is coupled to an optical front end. The optical front end may be configured to receive an optical signal from at least one optical transmitter over an optical channel. The optical front end may separate the received optical signal into orthogonal polarization components (e.g. an X-polarization component and a Y-polarization component) and orthogonal phase components (e.g. an in-phase (I) component and a quadrature-phase (Q) component) The optical front end may convert the separated optical signal components into four analog electrical signals or components, where each I or Q component of the polarization components may be received at one of the ADCs 111, 112, 113, or 114. For example, the ADC 111 may receive the I component of the X-polarization component, $X^R(I)$, the ADC 112 may receive the Q component of the X-polarization component, $X^R(Q)$, the ADC 113 may receive the I component of the Y-polarization component, $Y^R(I)$, and the ADC 114 may receive the Q component of the Y-polarization component, $Y^R(Q)$. The ADCs 111, 112, 113, and 114 may sample the received analog electrical signals at the ADCs' sampling rate and convert the analog electrical signals into digital electrical signals (e.g. sequences of digital samples) that may be processed by the first FDEQ 121 and second FDEQ 122. It should be noted that additional signal reconditioning may also be applied in the analog domain and/or digital domain to improve signal quality. For example, automatic gain controls may be applied to the analog electrical signals in order to utilize the ADCs' dynamic range effectively. Resampling and/or retiming may also be applied to the digital signals to align and maintain the same symbol timing and durations as the transmitter.

The first FDEQ 121 and second FDEQ 122 may be configured to receive the digital signal components from the ADCs 111, 112, 113, and 114 and perform signal distortions compensation, such as CD compensation. Each of the FDEQs 121 and 122 may comprise a pair of FFT and IFFT and may be configured to compensate for a specified amount of CD from optical transmission fibers. The first FDEQ 121 and second FDEQ 122 may send the CD compensated signal components to the time domain processing unit 130 for further signal conditioning before recovering the original transmitted data.

In an embodiment, the time domain processing unit 130 may comprise a TDEQ 131, a carrier recovery (CR) unit 132, and a slicer unit 133. The TDEQ 131 may be configured to receive frames from the first FDEQ 121 and second FDEQ 122 and perform time domain equalization. The TDEQ 131 may be configured as a butterfly-structured K-point finite impulse response (FIR) unit that dynamically tracks state of polarization (SOP), demodulates the X-polarization component and the Y-polarization component, and compensates for fiber PMD and residual distortions from preceding FDEQs 121 and 122. The TDEQ 131 may also be coupled to the CR unit 132 and the slicer unit 133. The CR unit 132 may be configured to track and compensate any mismatch in frequency and/or phase between an oscillator at the transmitter and a local oscillator at the DSP-based dual polarization coherent receiver 100. The slicer unit 133 may be configured to determine a digital high value or a digital low value from the received signal based on the amplitude and/or phase of the received signal.

Figure 2:
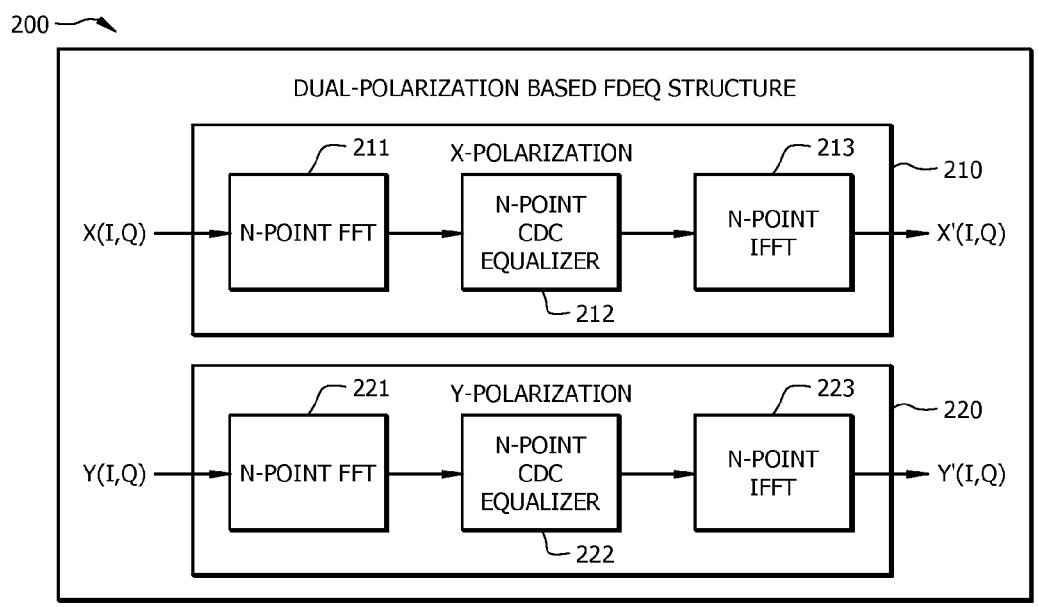
FIG. 2 is a schematic diagram of an embodiment of a dual polarization frequency domain equalizer (FDEQ) structure for CD compensation.

FIG. 2 is a schematic diagram of an embodiment of a dual polarization FDEQ structure 200 for CD compensation, which may be employed as an FDEQ in a single carrier based optical receiver, such as receiver 100. As shown in FIG. 2, each received polarization of a signal may receive independent CD compensation by applying a similarly structured FDEQ to each received polarization. For example, a first FDEQ 210 may be configured to compensate CD in an X-polarization component and a second FDEQ 220 may be configured to compensate CD in a Y-polarization component.

FDEQs 210 and 220 may be substantially similar to FDEQs 121 and 122, respectively. Each polarization component may comprise a I component and a Q component (e.g. using PM-QPSK coding). The first FDEQ 210 may be an N-tap FDEQ comprising an N-point FFT unit 211, an N-point CDC equalizer 212, and an N-point IFFT unit 213. The value N may refer to the number of points in an FFT, a CDC equalizer, or an IFFT. The N-point FFT unit 211 may transform the X-polarization component from the time domain into the frequency domain. The N-tap CDC equalizer 212 may be a frequency transfer function that models an inverse of CD in a transmission channel. The N-point IFFT unit 212 may transform the CD compensated signal into the time domain for further time domain processing. Similarly, the second FDEQ 220 may be an N-tap FDEQ comprising an N-point FFT unit 221, an N-point CDC equalizer 222, and an N-point IFFT unit 223. The Y-polarization component may be compensated in the same way as the X-polarization component. It should be noted the pair of FFT and IFFT in an FDEQ may or may not have the same size when a downsampling or an upsampling is performed in the frequency domain.

The size of an FDEQ may be determined by the amount of CD for which compensation is desired. Since CD increases with fiber transmission distances, the size of an FDEQ may be quite large at long distances. For example, an optical fiber communication system may typically support data rate of about 100 gigabits per second (Gbps) at about 30 gigabaud (Gbaud) symbol rate by employing PM-QPSK coding and soft decision forward error correction (SD-FEC). A transmission distance of about 1500 kilometer (km) of standard single mode fiber (SSMF) may result in CD of about 27 nanoseconds of group delay per nanometer (ns/nm). To compensate for about 27 ns/nm of CD at a symbol rate of about 30 Gbaud, an FDEQ may require at least about 1024 taps at a T/2 setting, where T is the symbol period. In addition, two FDEQs may be required for the X-polarization and Y-polarization. As such, the FDEQs may consume about forty percent or more of the total hardware resources (e.g. gate counts and power consumption) allocated for baseband digital signal processing.

To meet the need for a longer fiber transmission distance such as about 2500 km SSMF, an FDEQ with about 2048 taps may be required to compensate about 50 ns/nm of CD without compromising performance. As discussed above, the order of computational complexity of an FDEQ may be proportional to about $N \times \log_2(N)$. Thus, as the size of an FDEQ increases, the hardware resources and power consumption may become a great concern.

In an embodiment, an optical communication system may transmit data at a data rate, Rb bits per second (bps), where Rb may include data information bits, protocol overhead, and forward error correction (FEC) overhead. The optical communication system may operate at a higher symbol rate of Rs with a single carrier or at a lower symbol rate of Rsc with multiple subcarriers to achieve the same data rate of Rb. For example, a multiple subcarriers system may carry data information on multiple subcarrier signals. Thus, the single carrier symbol rates Rs and the multiple subcarrier signals symbol rate Rsc may be related as shown below:

$$Rsc = Rs/m \qquad (1)$$

where m is the number of subcarriers. The relation shown in equation (1) may be maintained for one or more polarizations and/or with higher order symbol mappers (e.g. PM-QPSK).

Each of the m multiple subcarriers may comprise a unique tone frequency and a unique spectral-shape. The m multiple subcarriers may be spectrally shaped by applying a Nyquist-shaping filter, and may be spaced at about 0.9×Rsc to about 1.1×Rsc apart in the frequency domain. For example, a 1.0× Rsc spacing may refer to a zero gap between subcarriers in the frequency domain. The Nyquist shaped subcarriers may be placed at about 1.05×Rsc apart to achieve a trade-off between spectral efficiency and inter-subcarrier crosstalk. The m Nyquist shaped subcarriers may therefore be termed as Nyquist m-subcarrier modulation. The Nyquist m-subcarrier modulation may be generated digitally in the electrical domain before being converted into an optical signal. Thus, the same electrical and optical front ends may be employed for a Nyquist m-subcarrier modulation system or a single carrier system. For example, a single carrier system and a Nyquist m-subcarrier modulation system may employ substantially similar digital-to-analog converters (DACs) and electrical to optical (E/O) optics at the transmitters, and substantially similar optical to electrical (O/E) optics and ADCs at the receivers, as long as the overall signal bandwidths for the transmitters are roughly the same.

It should be noted that a spectral-shaping m-subcarrier modulation system may be different from a coherent optical Orthogonal Frequency Domain Division Multiplexing (CO-OFDM) system in terms of spectral property and CD tolerance. A spectral-shaping m-subcarrier modulation system may employ multiple spectrally shaped subcarriers that are non-overlapping in frequency domain (e.g. spaced at about 1.05×Rsc apart), and an FDEQ may compensate for CD through a pair of FFT and IFFT. In contrast, a CO-OFDM system may employ multiple subcarriers that may be orthogonal mathematically but overlapping in a frequency domain. A CO-OFDM system may insert guard intervals in the time domain to provide ISI tolerance from dispersive channels at the expense of reduced spectral efficiency. If the guard intervals were reduced or completely eliminated, an FDEQ would be required at a CO-OFDM receiver to compensate for channel dispersion (e.g. CD). Thus, a reduced or zero guard interval CO-OFDM receiver may require a pair of N-point FFT and IFFT at the FDEQ in addition to a M-point FFT (e.g. value of M depends on number of subcarriers) used for demodulation and demultiplexing for each polarization component, where N may be about many orders greater than M. The complexity of a spectral-shaping m-subcarrier modulation receiver may benefit from the non-overlapping property of the subcarriers, such that CD compensation may be performed independently per subcarrier and the number of FDEQ taps may reduce at a rate of the square of the symbol rate, whereas a reduced or zero guard interval CO-OFDM receiver may not benefit from the same order of reduction.

In an embodiment, a spectral-shaping m-subcarrier modulation receiver may employ m copies of smaller sized FDEQ to compensate for the same amount of CD in a single carrier receiver. An example value for m may be about four to about eight. The number of subcarriers may be a power of two in order to use the efficient computation of FFT and IFFT in digital signal processing. For example, an N-tap FDEQ in a single carrier receiver may require an N-point FFT to compensate for a certain amount of CD, where the computational complexity of the N-point FFT may be about $N \times \log_2 N$ based on a Radix-2 realization. A spectral-shaping m-subcarrier modulation may employ m copies of smaller sized FDEQ with $(N/m^2)$-point FFT to compensate for the same amount of CD, where the complexity may be reduced to about $(N/m) \times \log_2(N/m^2)$.

Figure 3:
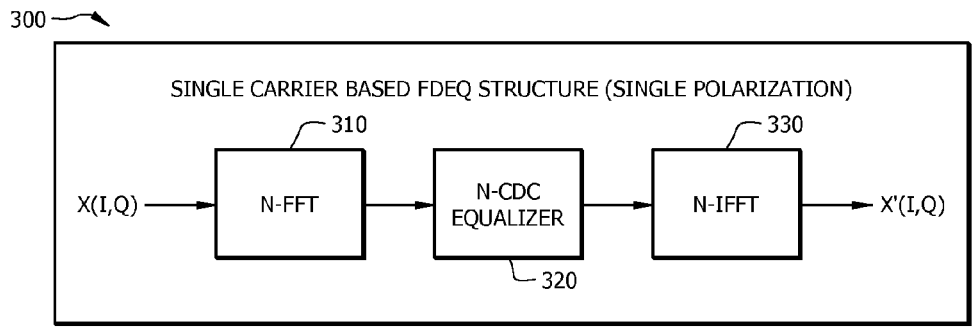
FIG. 3 is a schematic diagram of an embodiment of a single carrier based N-tap FDEQ structure for CD compensation.
Figure 4:
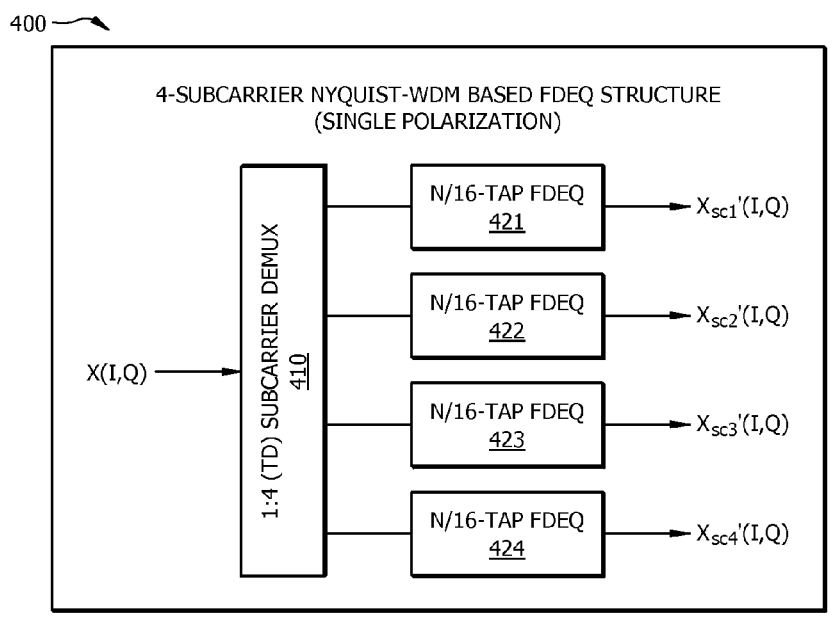
FIG. 4 is a schematic diagram of an embodiment of a Nyquist 4-subcarrier modulation based (N/16)-tap FDEQ structure for CD compensation.
Figures 5, 6:
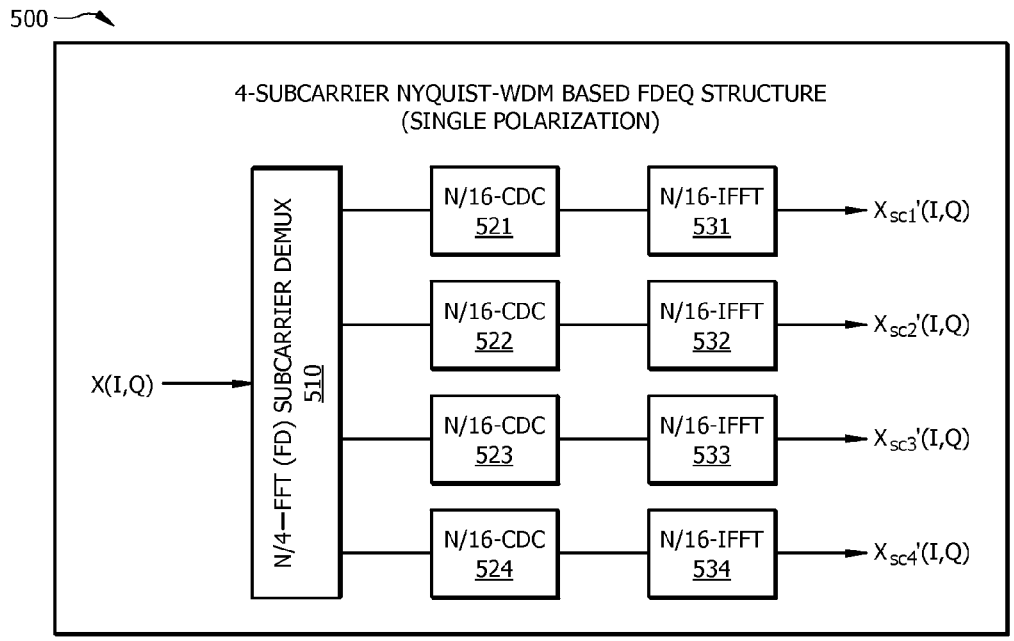
FIG. 5 is a schematic diagram of another embodiment of a Nyquist 4-subcarrier modulation based (N/16)-tap FDEQ structure for CD compensation.
FIG. 6 illustrates an embodiment of a DSP complexity table for a single carrier based FDEQ and a Nyquist 4-subcarrier modulation based FDEQ.

FIGS. 3-5 depict various example embodiments of FDEQ structures that may be employed in a coherent optical receiver. FIGS. 3-5 illustrate the differences between a single carrier based FDEQ operating at a symbol rate of Rs and a data rate of Rb versus a spectral-shaping m-subcarrier modulation based FDEQ operating at a lower symbol rate of Rsc=Rs/m and the same data rate Rb. Since CD may be compensated independently per polarization, FIGS. 3-5 illustrate FDEQ structures for one polarization only. However, the same FDEQ structure may be replicated for each polarization signal when multiple polarizations are employed. In addition, each polarization component may comprise an I component and a Q component depending on the coding scheme (e.g. PM-QPSK). Thus, the FDEQs may operate on a complex input signal and may apply complex FFT and IFFT.

FIG. 3 is a schematic diagram of an embodiment of a single carrier based N-tap FDEQ structure 300 for CD compensation, which may be similar to the X-polarization FDEQ 210 or the Y-polarization FDEQ 220 of FDEQ structure 200 and may operate at a symbol rate of Rs and a data rate Rb. FDEQ structure 300 may comprise an N-point FFT unit 310, an N-point CDC equalizer 320, and an N-point IFFT unit 330. The N-point FFT unit 310 may transform a received signal from the time domain into the frequency domain. The N-tap CDC equalizer 320 may be a frequency transfer function that may model the inverse of CD in a transmission channel, thus compensating CD when multiplied by the transfer function. The N-point IFFT unit 330 may transform the CD compensated signal from the frequency domain into the time domain.

A Spectral-shaping m-subcarrier modulation receiver may receive a signal that comprises multiple subcarrier signals. The subcarrier signals may be demultiplexed prior to CD compensation, which may be performed in either the time domain (TD) or the frequency domain (FD). FIG. 4 is a schematic diagram of an example embodiment of a spectral-shaping 4-subcarrier modulation based (N/16)-tap FDEQ structure 400 for CD compensation. The FDEQ structure 400 may comprise a TD subcarrier demultiplexer 410 and a plurality of (N/16)-tap FDEQs 421, 422, 423, and 424. Each FDEQ 421, 422, 423, and 424 may comprise a (N/16)-point FFT unit, a (N/16)-tap CDC equalizer, and a (N/16)-point IFFT unit. The FDEQ structure 400 may be employed as an FDEQ for each polarization in a spectral-shaping 4-subcarrier modulation based optical receiver. The FDEQ structure 400 may operate at a symbol rate Rsc and a data rate Rb and may demultiplex subcarriers in the TD. As discussed earlier, CD is inversely proportional to the square of the symbol rate, thus FDEQs with (N/16) taps may be employed when the symbol rate is reduced by a factor of four when compared to the single carrier based FDEQ structure 300 of FIG. 3. In FDEQ structure 400, the input signal may comprise a combination of the four subcarrier signals. Thus, the TD subcarrier demultiplexer 410 may demultiplex the received signal into four subcarrier signals. After the subcarrier signals are demultiplexed, frequency domain equalization may be applied to each subcarrier signal separately via the four (N/16)-tap FDEQs 421, 422, 423, and 424 to compensate CD.

FIG. 5 is a schematic diagram of another embodiment a spectral-shaping 4-subcarrier modulation based (N/16)-tap FDEQ structure 500 for CD compensation. The FDEQ structure 500 may comprise a (N/4)-point FFT unit 510, four (N/16)-tap CDC equalizers 521, 522, 523, and 524, and four (N/16)-point IFFT units 531, 532, 533, and 534. The CDC equalizers 521, 522, 523, and 524 may be substantially similar to the CDC equalizer in the FDEQs 421, 422, 423, and 424, respectively. The IFFT units 531, 532, 533, and 534 may be similar to the IFFT units in the FDEQs 421, 422, 423, 424, respectively. The FDEQ structure 500 may be employed as an FDEQ for each polarization in a spectral-shaping 4-subcarrier modulation based optical receiver. The FDEQ structure 500 may operate at symbol rate Rsc and data rate Rb and may demultiplex subcarriers in FD instead of TD. A FD subcarrier demultiplexer may be more desirable since subcarriers demultiplexing may be employed in FFT operations and CDC equalization may be applied directly in the FD. In FDEQ structure 500, the input signal may comprise a combination of four subcarrier signals. The (N/4)-point FFT unit 510 may serve as a FD subcarrier demultiplexer. For example, after FFT processing, a spectral-shaping m-subcarrier modulated signal may be separated into m groups of signal in the frequency domain based on some frequency signatures (e.g. tone frequencies and spectrally-shaped subcarriers). After the subcarrier signals are demultiplexed, each subcarrier signal (e.g. grouped in frequency domain) may be compensated independently by a CDC equalizer and transformed into the time domain by an IFFT unit. For example, the (N/16)-tap CDC equalizer 521 and the (N/16)-point IFFT unit 531 may be applied to the first subcarrier signal. Similarly, the (N/16)-tap CDC equalizers 522, 523, and 524 and the (N/16)-point IFFT units 532, 533, and 534 may be applied to the second, third, and fourth subcarrier signal, respectively.

FIG. 6 illustrates an embodiment of a DSP computational complexity table 600. Table 600 lists the DSP computational complexity of FFT needed for compensating 27 ns/nm of CD using a single carrier based FDEQ, such as FDEQ structure 300, at 30 Gbaud and a spectral-shaping 4-subcarrier modulation based FDEQ, such FDEQ structures 400 and 500, at 7.5 Gbaud, where both FDEQs may support about the same data rate. The single carrier based FDEQ may employ an N-point (e.g. 1024-point) complex FFT and a spectral-shaping 4-subcarrier modulation based FDEQ may employ four sets of N/16-point (e.g. 64-point) complex FFT. The FFT may be realized using radix-2 implementation with either decimation in frequency or decimation in time. As shown in table 600, the FDEQ structures 400 and 500 may reduce the FFT computational complexity by a factor of about seven to about nine in terms of real additions and real multiplications when compared to the FDEQ structure 300. It should be noted that the computational complexity for the CDC equalizer and the IFFT in the FDEQ structures 400 and 500 may also be reduced. In addition, the smaller sized FDEQ (e.g. N/16 taps) may reduce the memory requirements.

Figures 7, 8:
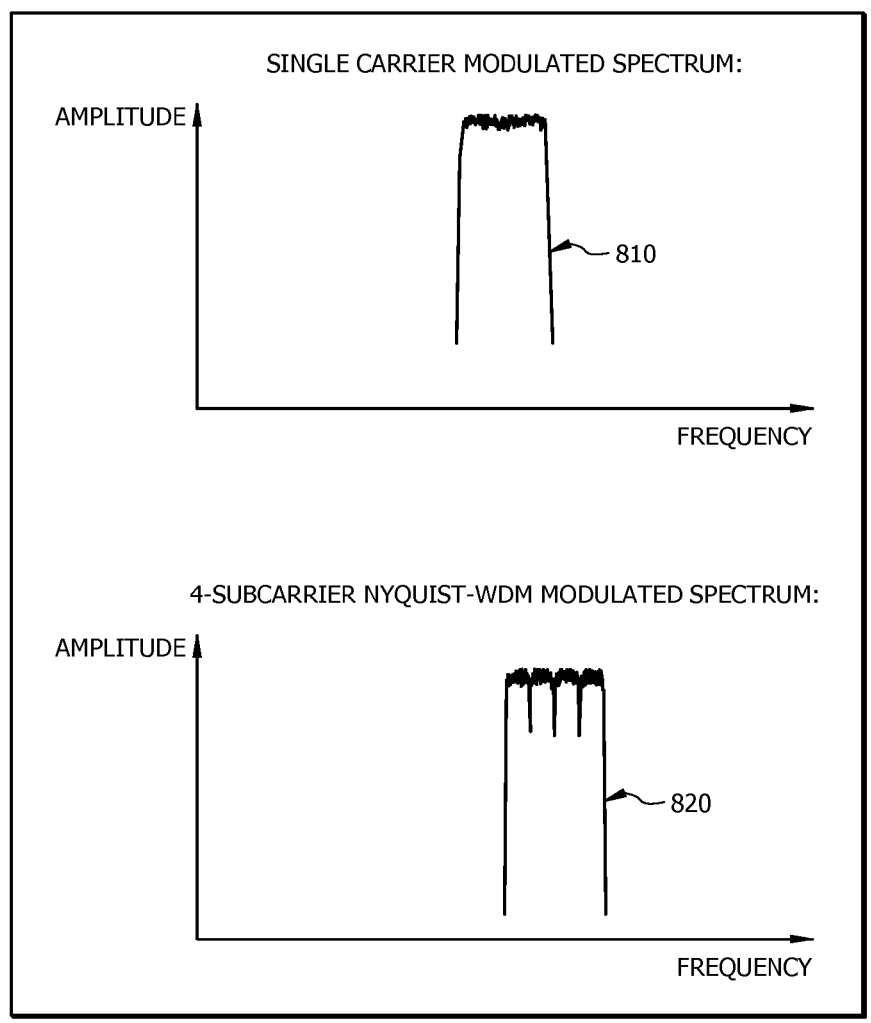
FIG. 7 illustrates another embodiment of a DSP complexity table for a single carrier based FDEQ and a Nyquist 4-subcarrier modulation based FDEQ.
FIG. 8 illustrates an embodiment of a frequency spectra view of a Nyquist shaped single carrier modulated spectrum and a Nyquist 4-subcarrier modulated spectrum.

FIG. 7 illustrates another embodiment of a DSP complexity table 700 for a single carrier based FDEQ, such as FDEQ structure 300, and a spectral-shaping 4-subcarrier modulation based FDEQ, such as FDEQ 400 or 500, which may employ a more efficient split-radix FFT implementation. As shown in table 700, the split-radix implementation may also achieve a reduction in computational complexity by a factor of about seven or more in terms of real additions and real multiplications. The reduction in FDEQ's size may result in similar savings in hardware resources in terms of gate counts for logics and memory.

FIG. 8 illustrates an embodiment of a frequency spectra view 800. The x-axis may represent frequency and the y-axis may represent amplitude. In frequency spectra view 800, spectrum 810 may be a single carrier modulated spectrum received at a single carrier receiver, while spectrum 820 may be a spectral-shaping 4-subcarrier modulated spectrum received at a spectral-shaping 4-subcarrier modulation based receiver. Both receivers may support substantially the same data rate, where the spectral-shaping 4-subcarrier modulation receiver may be operating at a symbol rate four times slower (e.g. Rsc=Rs/4) than the single carrier based receiver. For example, a single carrier based FDEQ, such as FDEQ 300, may receive a signal with a spectrum similar to the single carrier modulated spectrum 810, whereas a spectral-shaping 4-subcarrier modulation based FDEQ, such as FDEQ 400 and/or 500, may receive a signal with a spectrum similar to the spectral-shaping 4-subcarrier modulated spectrum 820.

The four subcarriers may be evident in the spectrum 820, where the four subcarriers are separated by some gaps in the frequency domain (e.g. 1.05×Rsc). The overall bandwidth of the spectral-shaping 4-subcarrier modulated spectrum 820 may be similar to the bandwidth of the single carrier modulated spectrum 810. However, spectral-shaping may not separate the subcarriers perfectly in a real system. Thus, some subcarrier spacing (e.g. 1.05×Rsc) may be added to ensure that the subcarriers are non-overlapping in frequency domain. This may result in a slightly larger bandwidth for a spectral-shaping m-subcarrier modulation system when compared to a single carrier system.

Figure 9:
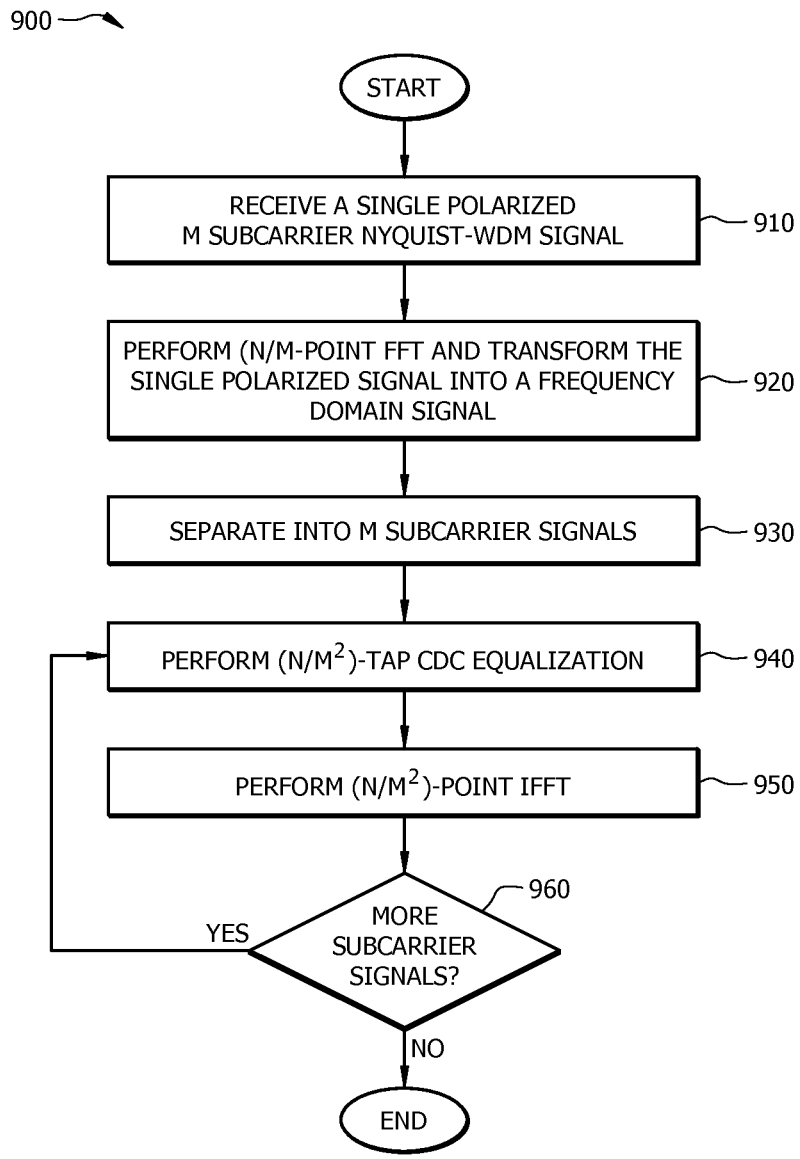
FIG. 9 is a flowchart of an embodiment of a CD compensation method employing Nyquist m-subcarrier modulation.

FIG. 9 is a flowchart of an embodiment of a CD compensation method 900 employing a spectral-shaping m-subcarrier modulation, which may be implemented on a DSP-based coherent receiver, such as DSP-based dual polarization coherent receiver 100, or a transceiver unit, such as transceiver unit 1500 described herein below with respect to FIG. 15. The method 900 may begin with receiving a polarized m-subcarrier modulation signal in step 910. The value m may be a power of two (e.g. about four or about eight). At step 920, method 900 may perform a (N/m)-point FFT. The value N may be determined based on an amount of CD for which compensation is desired. The amount of CD in a transmission link may vary with network deployment, for example based on transmission fiber lengths and/or fiber types. After FFT processing, the received signal is transformed into the frequency domain. At step 930, method 900 may separate the frequency domain signal into m groups of signal (e.g. subcarrier sub-streams) in the frequency domain, based on subcarrier frequency signatures (e.g. tone frequencies and spectrally-shaped subcarriers). At step 940, method 900 may perform a $(N/m^2)$-tap CDC on subcarrier sub-streams to compensate for CD. The CDC equalizer may be configured to perform the inverse of CD in a transmission channel. At step 950, method 900 may perform a $(N/m^2)$-tap IFFT to transform the CD compensated signal into the time domain. It should be noted that method 900 may be replicated for each polarization signal when multiple polarizations (e.g. X-polarization component and Y-polarization component) are employed. In addition, each polarization component may comprise an I component and a Q component (e.g. with PM-QPSK modulation) and thus the steps in method 900 may involve complex operations.

In an embodiment, a transmitter that generates spectral-shaping m-subcarrier modulation signals may be employed to enable spectral-shaping m-subcarrier modulation based FDEQ for CD compensation. Advanced technologies in high speed digital-to-analog converters (DACs) and high performance DSPs may allow a single carrier signal or spectral-shaping m-subcarrier modulation signals to be generated digitally in the electrical domain. In addition, a DSP-based transmitter may perform pre-compensation (e.g. CD compensation) and/or any arbitrary pulse shaping at a DSP. Since the single carrier signal or m-subcarrier signal may be generated digitally, the conversion from digital to analog (D/A), and from E/O may be performed by using the same set of DACs and E/O optics at a single carrier transmitter or a spectral-shaping m-subcarrier transmitter.

Figure 10:
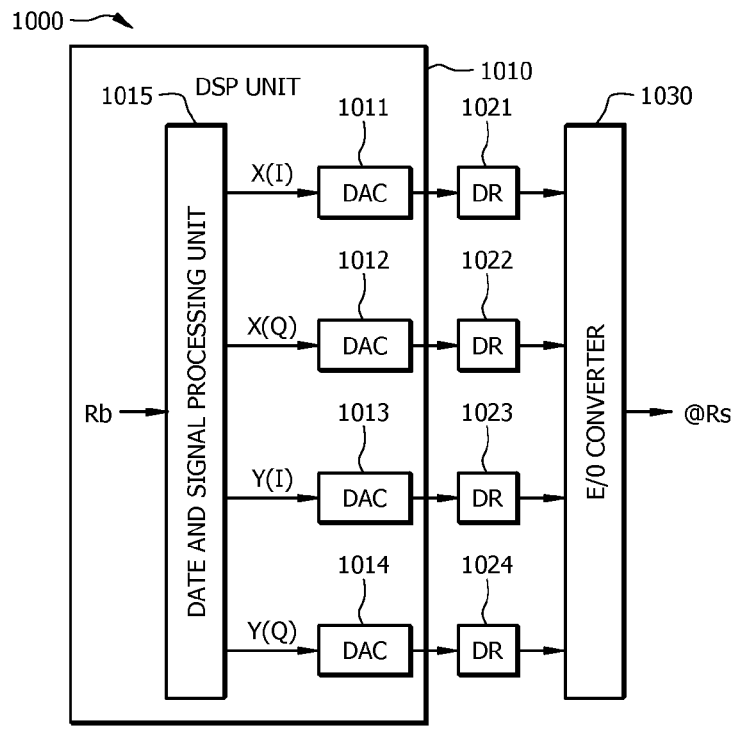
FIG. 10 is a schematic diagram of an embodiment of a DSP-based single carrier optical transmitter.

FIG. 10 is a schematic diagram of an embodiment of a DSP-based single carrier optical transmitter 1000. The optical transmitter 1000 may comprise a front end 1060 and a DSP unit 1010. The front end 1060 may comprise a plurality of drivers 1021, 1022, 1023, and 1024, and an E/O converter 1030. The DSP unit 1010 may comprise a data and signal processing unit 1015 and a plurality of DACs 1011, 1012, 1013, and 1014. The DSP unit 1010 may be referred to simply as a DSP, and may comprise an ASIC DSP. The DACs 1011, 1012, 1013, and 1014 may be on-chip as shown in the DSP-based single optical transmitter 1000 or off-chip. The data and signal processing unit 1015 may be coupled to the DACs 1011, 1012, 1013, and 1014. The data and signal processing unit 1015 may be realized in hardware and/or implemented as a DSP software component.

The optical transmitter 1000 may be any device that may operate on an input data bit stream at a data rate of Rb or multiple data bit streams with an aggregated data rate of Rb and generate an optical signal at a symbol rate of Rs. For example, the optical transmitter 1000 may map the input data bit stream into PM-QPSK symbols (e.g. 4-bits per symbol), thus the symbol rate Rs may be one fourth of the data rate Rb (e.g. Rs=Rb/4). The signal processing unit 1015 may be configured to convert the input data bit stream into digital signals through bit mapping, bit distribution, Nyquist filtering (e.g. spectral shaping), and digital pre-compensation. The digital signals may correspond to an I component and a Q component of an X-polarization component (e.g. $X^T(I)$ and $X^T(Q)$), and an I component and a Q component of a Y-polarization component (e.g. $Y^T(I)$ and $Y^T(Q)$). The data and signal processing unit 1015 may couple each digital signal to one of the DACs 1011, 1012, 1013, or 1014. For example, the DACs 1011, 1012, 1013, and 1014 may convert the digital signals $X^T(I)$, $X^T(Q)$, $Y^T(I)$, and $Y^T(Q)$ into analog electrical signals, respectively. The DACs 1011, 1012, 1013, and 1014 may be coupled to the drivers 1021, 1022, 1023, and 1024, respectively. Each driver 1021, 1022, 1023, or 1024 may comprise a radio frequency (RF) amplifier, which may amplify the analog electrical signals. The drivers 1021, 1022, 1023, and 1024 may be coupled to the E/O converter 1030. The E/O converter 1030 may comprise a laser, E/O optics, such as a Polarization division Multiplexed (PM) in-phase and quadrature-phase (PM-I&Q) modulator, and other electrical and/or optical components. The E/O converter 1030 may be configured to convert and combine the electrical signals into optical signals that are suitable for transmission in an optical fiber. The spectrum of the output optical signal may be similar to the single carrier modulated spectrum 810 described with respect to FIG. 8.

Figure 11:
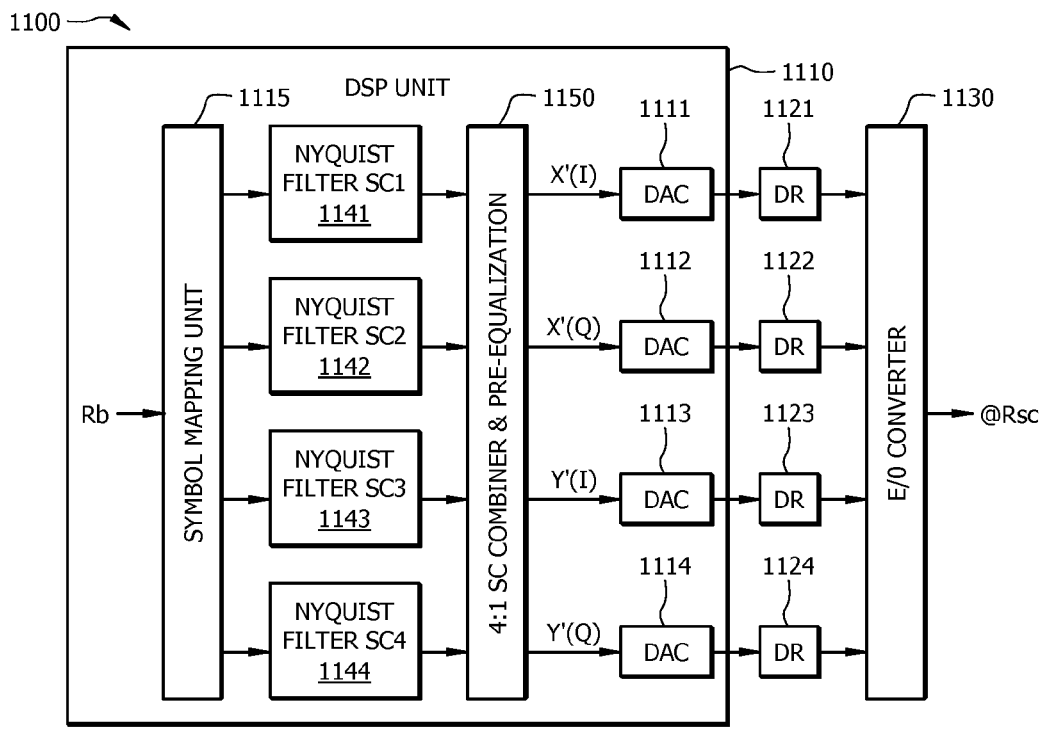
FIG. 11 is a schematic diagram of an embodiment of a DSP-based Nyquist 4-subcarrier modulation optical transmitter.

FIG. 11 is a schematic diagram of an embodiment of a DSP-based spectral-shaping 4-subcarrier modulation optical transmitter 1100. The optical transmitter 1100 may comprise a front end 1160 and a DSP unit 1110. The front end 1160 may comprise a plurality of drivers 1121, 1122, 1123, and 1124, and an E/O converter 1130. The DSP unit 1110 may comprise a symbol mapping unit 1115, a plurality of spectral-shaping filters 1141, 1142, 1143, and 1144, a subcarrier signal combiner 1150, and a plurality of DACs 1111, 1112, 1113, and 1114. The DSP unit 1110 may be referred to simply as a DSP, and may comprise an ASIC DSP. The DACs 1111, 1112, 1113, and 1114 may be on-chip as shown in the DSP-based single optical transmitter 1100 or off-chip. The symbol mapping unit 1115, the spectral-shaping filters 1141, 1142, 1143, and 1144, and the subcarrier signal combiner 1150 may be realized in hardware and/or implemented as DSP software components.

The optical transmitter 1100 may be any device that may operate on an input data bit stream at a data rate of Rb and generate an optical signal with m spectrally shaped frequency non-overlapping subcarriers (e.g. Nyquist-like shaped subcarriers at subcarrier spacing of 1.05×Rsc) at a symbol rate of Rsc. The subcarrier signals may be generated electrically in the digital domain, thus the spectral-shaping 4-subcarrier modulation optical transmitter 1100 may employ electrical and optical front ends that are substantially similar to those used in the single carrier optical transmitter 1000.

The symbol mapping unit 1115 may be configured to map the input data bit stream into symbols according to a desired coding rule. For example, the symbol mapping unit 1115 may map the input data bit stream into data symbols according to a desired coding rule, such as PM-QPSK, and distribute the PM-QPSK symbols into four symbol mapped subcarrier sub-streams. As such, the symbol rate Rsc may be one sixteenth of the data rate Rb (e.g. Rsc=Rb/16). The symbol mapping unit 1115 may also be configured to perform bit distribution first and then followed by symbol mapping. Each subcarrier sub-stream may comprise an I component and a Q component of an X-polarization component (e.g. $X_{sci}(I)$ and $X_{sci}(Q)$), and an I component and a Q component of a Y-polarization component (e.g. $Y_{sci}(I)$ and $Y_{sci}(Q)$). The symbol mapping unit 1115 may couple a first subcarrier sub-stream to the spectral-shaping filter 1141 for subcarrier 1, a second subcarrier sub-stream to the spectral-shaping filter 1142 for subcarrier 2, a third subcarrier sub-stream to the spectral-shaping filter 1143 for subcarrier 3, and a fourth subcarrier sub-stream to the spectral-shaping filter 1144 for subcarrier 4.

The spectral-shaping filters 1141, 1142, 1143, and 1144 may be configured to perform spectral shaping on the corresponding subcarrier sub-streams to minimize spectral spreading to generate frequency non-overlapping subcarrier signals. It should be noted that other spectral shaping filters may also be used. The Nyquist filter 1141, 1142, 1143, and 1144 may be coupled to the signal combiner 1150. The signal combiner 1150 may be configured to combine the subcarrier sub-streams for each component to produce four digital signals (e.g. $X^{T_1}(I)$, $X^{T_1}(Q)$, $Y^{T_1}(I)$, and $Y^{T_1}(Q)$). The signal combiner 1150 may also be configured to perform pre-equalization to pre-compensate for component and fiber impairments. For example, an equalizer with a pair of M-point FFT and IFFT may be applied for pre-compensation (e.g. CD, bandwidth (BW)), where the equalizer may be similar to FDEQ structure 400 or 500. It should be noted that a transmitter and a receiver may or may not employ equalizers of the same size. After the combining and pre-compensation, the signal combiner 1150 may couple each digital signal to one of the DACs 1111, 1112, 1113, or 1114. For example, the DACs 1111, 1112, 1113, and 1114 may convert the digital signals $X^{T_1}(I)$, $X^{T_1}(Q)$, $Y^{T_1}(I)$ and $Y^{T_1}(Q)$ into analog electrical signals, respectively. The DACs 1111, 1112, 1113, and 1114 may be coupled to the drivers 1121, 1122, 1123, and 1124, respectively. Each driver 1121, 1122, 1123, or 1124 may comprise a radio frequency (RF) amplifier to amplify the electrical signal. The drivers 1121, 1122, 1123, and 1124 may be coupled to the E/O converter 1130. The E/O converter 1130 may convert and combine the electrical signals produced from the drivers 1121, 1122, 1123, and 1124 into an optical signal that may be suitable for transmission in an optical fiber. As such, the output optical signal may carry a combination of the four subcarrier signals. The spectrum of the output optical signal may be similar to the Spectral-shaping 4-subcarrier modulated spectrum 820 described with respect to FIG. 8.

Figure 12:
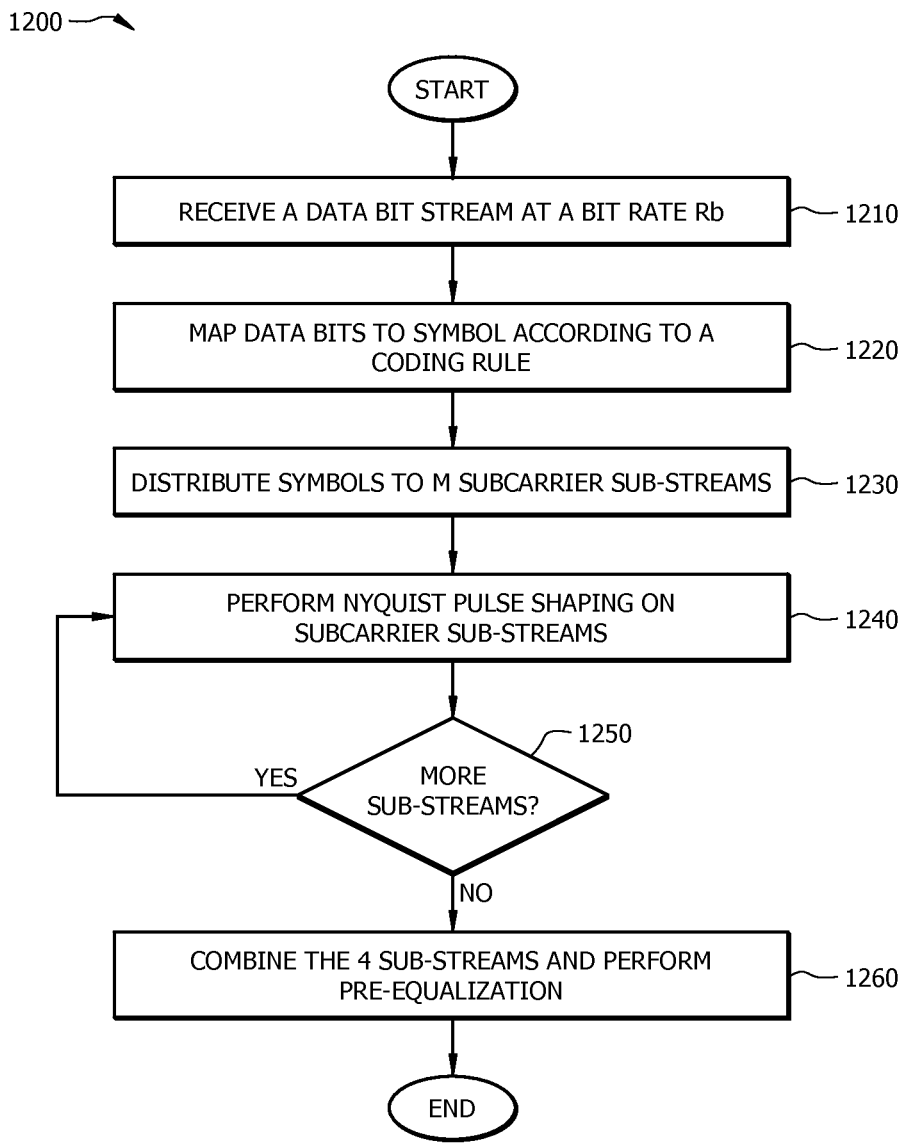
FIG. 12 is a flowchart of an embodiment of a Nyquist m-subcarrier modulation generation method.

FIG. 12 is a flowchart of an embodiment of a spectral-shaping m-subcarrier modulation generation method 1200, which may be implemented on a DSP-based spectral-shaping m-subcarrier modulation optical transmitter, such as the DSP-based spectral-shaping m-subcarrier modulation transmitter 1100, or a transceiver unit, such as transceiver unit 1500 described herein below with respect to FIG. 15. The method 1200 may begin with receiving a data bit stream at a bit rate of Rb at step 1210. At step 1220, method 1200 may map the data bits into symbols according to a desired coding rule (e.g. PM-QPSK). At step 1230, method 1200 may distribute and map the symbols into m subcarrier sub-streams, where m may be the number of subcarriers. Each subcarrier sub-stream may comprise two orthogonal polarization components and each polarization component may comprise an I component and a Q component (e.g. PM-QPSK coding). At step 1240, method 1200 may perform Nyquist shaping on all the subcarrier sub-streams. At step 1250, method 1200 may combine each component from the m sub-streams and perform pre-equalization. It should be noted that the bit to symbol mapping in step 1220 and symbol distribution in step 1230 may be performed in a reverse order (e.g. distribute bits to subcarriers and then map bits to symbols). In addition, the subcarrier signals may not be limited to carry data symbols with the same coding rules and/or same symbol rate. The following table provides an example of subcarrier signals employing different coding rules at the same symbol rate:

| Modulation scheme | | C (bits/symbol) | mapping rule | Rs (Gbaud) | Rb (Gbps) |
|---|---|---|---|---|---|
| single carrier | SC1 | 4 | PM-QPSK | 32 | 128 |
| single carrier | SC1 | 8 | PM-16QAM | 32 | 256 |
| 4-subcarrier | SC1 to SC4 | 4 | PM-QPSK | 8 | 128 |
| 4-subcarrier | SC1 to SC4 | 8 | PM-Q16QAM | 8 | 256 |
| 4-subcarrier | SC1 | 4 | PM-QPSK | 8 | 200 |
| | SC2 | 6 | PM-8QAM | 8 | |
| | SC3 | 7 | 128-SP-QAM | 8 | |
| | SC4 | 8 | PM-16QAM | 8 | |

Figure 13:
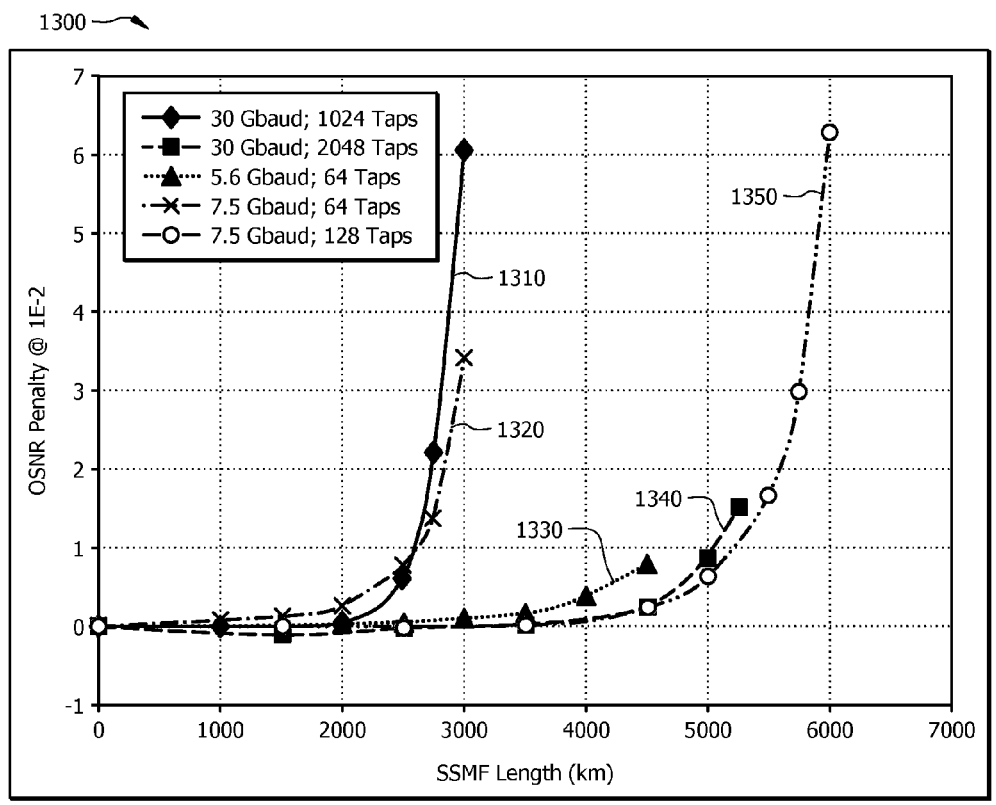
FIG. 13 illustrates an embodiment of simulated CD tolerance curves for FDEQs with different sizes and symbol rates.

FIG. 13 is a graph 1300 illustrating simulated CD tolerance for FDEQs with different sizes and symbol rates. The x-axis may represent SSMF length in km. The y-axis may represent optical signal-to-noise ratio (OSNR) penalty in decibel (dB). In graph 1300, curves 1310, 1320, 1340, and 1350 are plots of OSNR penalty at uncoded BER (e.g. before applying FEC) of 0.01 as a function of SSMF lengths varying from about 0 km to about 6000 km. The curves 1310, 1320, 1340, and 1350 correspond to OSNR penalty measured at a 30 Gbaud receiver with 1024-taps FDEQ, a 7.5 Gbaud with 64-taps FDEQ, a 30 Gbaud receiver with 2048-taps FDEQ, and a 7.5 Gbaud with 128-taps FDEQ, respectively. As shown in the curves 1310 and 1320, the 30 Gbaud receiver with 1024-taps FDEQ and the 7.5 Gbaud receiver with 64-taps FDEQ may achieve similar performance. Similarly, the curves 1340 and 1350 may show that the 30 Gbaud receiver with 2048-taps FDEQ and the 7.5 Gbaud receiver with 128-taps FDEQ may achieve similar performance. This observation may illustrate that the size of an FDEQ may be reduced at a rate of the square of the symbol rate while maintaining similar performance or CD tolerance. Another observation may be that longer FDEQ taps may achieve the same performance at a longer distance as shown in the curves 1310 and curve 1340, or the curves 1320 and 1350.

Figure 14:
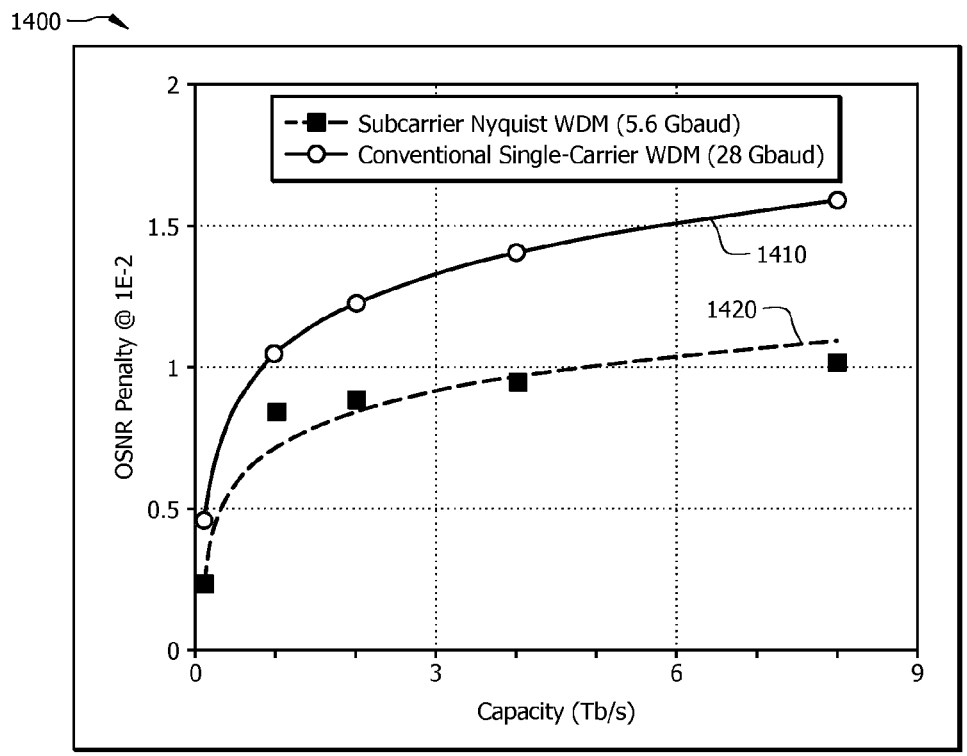
FIG. 14 illustrates an embodiment of simulated transmission performance curves of Wavelength Division Multiplexing (WDM) transmission systems for a single carrier modulation at high symbol rate and a Nyquist 4-subcarrier modulation at low symbol rate.

FIG. 14 is a graph 1400 illustrating simulated transmission performance of WDM transmission systems for a single carrier modulation at high symbol rate and a spectral-shaping 4-subcarrier modulation at low symbol rate. The x-axis may represent transmission capacity in terabits per second (Tbps). The y-axis may represent OSNR penalty in dB. In graph 1400, curves 1410 and 1420 are plots of OSNR penalty at uncoded BER of 0.01 as a function of transmission capacity. The curves 1410 and 1420 correspond to OSNR penalty measured at a 30 Gbaud single carrier receiver and a 7.5 Gbaud spectral-shaping 4-subcarrier modulation receiver, respectively. The two receivers may be employing FDEQs with similar CD tolerance. By comparing curves 1410 and 1420, the spectral-shaping 4-subcarrier modulation receiver may achieve a lower OSNR penalty at the same transmission capacity as a single carrier receiver. Thus, a spectral-shaping 4-subcarrier modulation transmission system may provide a higher tolerance against non-linear fiber impairments by about 0.5 dB when compared to the single carrier transmission system in addition to the computational complexity reduction.

The disclosed example embodiments illustrate that a spectral-shaping m-subcarrier modulation system may reduce computational complexity and hardware resources for CD compensation, and may provide a higher non-linearity tolerance when compared to a single carrier system. It should be noted that the example embodiments may be described with four subcarriers and dual-polarizations for illustration purpose. However, more subcarriers and/or fewer polarizations may be employed to achieve similar order of savings in computational complexity and improvement in non-linearity tolerance. In addition, other spectral shaping methods may be employed to achieve similar performance instead of the Nyquist shaping described herein.

Figure 15:
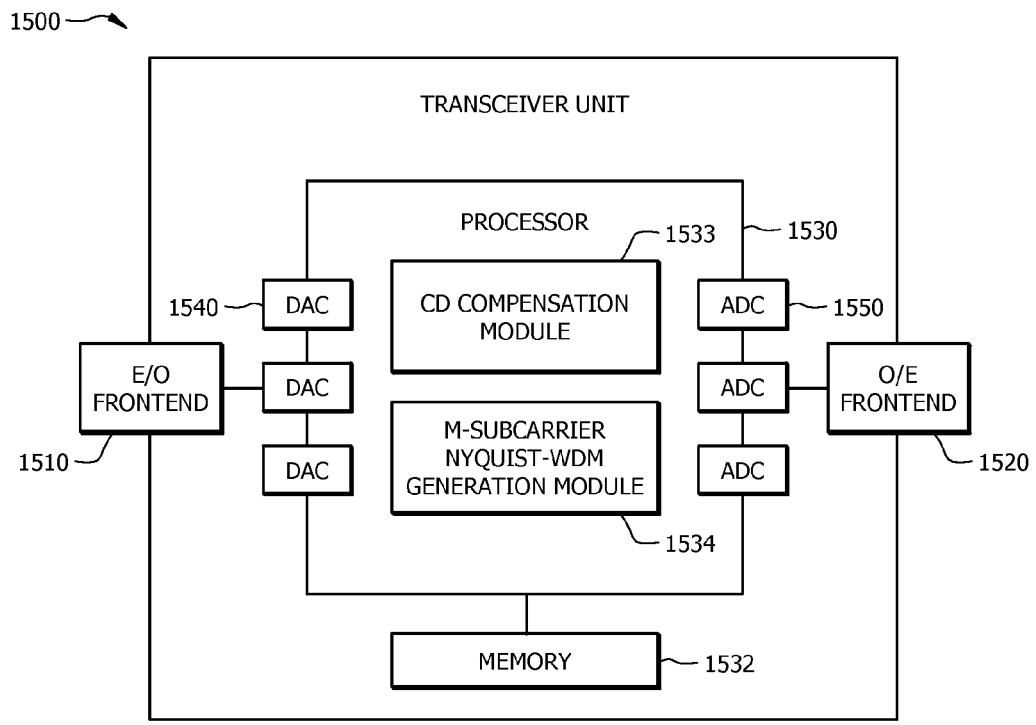
FIG. 15 is a schematic diagram of an embodiment of a transceiver unit.

FIG. 15 is a schematic diagram of an embodiment of a transceiver unit 1500, which may be any device that transmits and/or receives optical signals with encoded data. For example, the transceiver unit 1500 may be located in an optical transmission system, which may implement all or part of the DSP-based dual polarization coherent optical receiver 100, and/or the spectral-shaping 4-subcarrier modulation based FDEQ structures 400 or 500, and/or the spectral-shaping 4-subcarrier modulation based optical transmitter 1100. The transceiver unit 1500 may also be configured to implement or support any of the schemes described herein, such as the spectral-shaping m-subcarrier modulation based CD compensation method 900 and/or spectral-shaping m-subcarrier modulation generation method 1200. In some embodiments transceiver unit 1500 may also act as other node(s) in an optical transport network (OTN), such as an optical line terminal (OLT), an optical network unit (ONU), and/or other optical network elements. One skilled in the art will recognize that the term transceiver unit encompasses a broad range of devices of which transceiver unit 1500 is merely an example. Transceiver unit 1500 is included for purposes of clarity of discussion, but is in no way meant to limit the application of the present disclosure to a particular transceiver unit embodiment or class of transceiver unit embodiments. At least some of the features/methods described in the disclosure may be implemented in a network apparatus or component such as a transceiver unit 1500. For instance, the features/methods in the disclosure may be implemented using hardware, firmware, and/or software installed to run on hardware. As shown in FIG. 15, the transceiver unit 1500 may comprise an E/O frontend 1510 and/or an O/E frontend 1520, which may convert an electrical signal to an optical signal for transmission in an OTN and/or receive an optical signal from the ODN and convert the optical signal to an electrical signal, respectively. A processor 1530 may be coupled to the E/O frontend 1510 and the O/E frontend 1520 via a plurality of DACs 1540 and ADCs 1550, respectively, which may or may not be part of the processor 1530. The DACs 1540 may convert digital electrical signals generated by the processor 1530 into analog electrical signals that may be fed into the E/O frontend 1510. The ADCs 1550 may convert analog electrical signals received from the O/E frontend 1520 into digital electrical signals that may be processed by the processor 1530. The processor 1530 may comprise one or more multi-core processors and/or memory devices 1532, which may function as data stores, buffers, etc. Processor 1530 may be implemented as a general processor or may be part of one or more ASICs and/or DSPs.

Processor 1530 may comprise a CD compensation module 1533 and a spectral-shaping m-subcarrier modulation generation module 1534, which may implement the CD compensation method 900 and the spectral-shaping m-subcarrier modulation generation method 1200, respectively, at a receiver and/or a transmitter. In an alternative embodiment, the CD compensation module 1533 and the spectral-shaping m-subcarrier modulation generation module 1534 may be implemented as instructions stored in the memory devices 1532, which may be executed by processor 1530. The memory module 1532 may comprise a cache for temporarily storing content, e.g., a Random Access Memory (RAM). Additionally, the memory module 1532 may comprise a long-term storage for storing content relatively longer, e.g., a Read Only Memory (ROM). For instance, the cache and the long-term storage may include dynamic random access memories (DRAMs), solid-state drives (SSDs), hard disks, or combinations thereof.

It is understood that by programming and/or loading executable instructions onto the transceiver unit 1500, at least one of the processor 1530 and/or memory module 1532 are changed, transforming the transceiver unit 1500 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design, numbers of units to be produced, and/or clock speed requirements rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g. from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Unless otherwise stated, the term "about" means ±10% of the subsequent number. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An optical transmitter configured to communicate with an optical receiver, wherein the optical transmitter comprises:
   a digital signal processor (DSP) unit configured to:
   map data symbols onto a plurality of electrical subcarrier signals that are non-overlapping in a frequency domain;
   perform spectral shaping on each of the subcarrier signals;
   combine the subcarrier signals into a combined output signal; and
   apply at least one N-point pre-equalizer to the combined output signal to pre-compensate for transmission channel distortions, wherein N is a positive integer that is inversely proportional to a total number of the subcarrier signals; and a frontend coupled to the DSP unit and configured to:
  convert the combined output signal into an optical signal; and
  transmit the optical signal,
    wherein each of the subcarrier signals is associated with a unique tone frequency and a unique spectral shape.

2. The optical transmitter of claim 1, wherein the DSP unit is further configured to apply at least one fast Fourier transform (FFT) module and at least one inverse FFT (IFFT) module.

3. The optical transmitter of claim 1, wherein each subcarrier signal comprises two orthogonal polarization components, wherein each polarization component comprises an in-phase (I) component and a quadrature-phase (Q) component, and wherein combining the subcarrier signals comprises:
  combining the I component of each polarization of each subcarrier signal into a combined I component of each polarization; and
  combining the Q component of each polarization of each subcarrier signal into a combined Q component of each polarization.

4. The optical transmitter of claim 1, wherein the DSP unit is further configured to perform spectral shaping on each of the subcarrier signals by filtering each subcarrier signal with a separate shaping filter.

5. The optical transmitter of claim 1, wherein mapping the data symbols onto the subcarrier signals comprises:
  converting data bits into the data symbols; and
  distributing the data symbols onto the subcarrier signals,
    wherein the data symbols are transmitted at a symbol rate dependent on a number of subcarrier signals and a number of the data bits per symbol for each subcarrier signal.

6. The optical transmitter of claim 1, wherein mapping the data symbols onto the subcarrier signals comprises distributing data bits to the subcarrier signals and converting the data bits into the data symbols according to a selected coding rule of each subcarrier signal.

7. An optical receiver comprising:
  a frontend configured to:
    receive an optical signal; and
    convert the optical signal into a plurality of digital electrical signals comprising a plurality of spectrally shaped subcarrier signals carrying symbol mapped data information; and
  a digital signal processor (DSP) unit coupled to the frontend and configured to:
    receive the digital signals from the frontend;
    demultiplex the digital signals into the subcarrier signals; and
    compensate chromatic dispersion (CD) for each of the subcarrier signals using at least one N-point CD compensation (CDC) equalizer,
      wherein each of the subcarrier signals is associated with a unique tone frequency and a unique spectral shape, and
      wherein N is a positive integer that is inversely proportional to a total number of the subcarrier signals.

8. The optical receiver of claim 7, wherein the spectrally shaped subcarrier signals are Nyquist shaped subcarrier signals that are non-overlapping in a frequency domain.

9. The optical receiver of claim 7, wherein the subcarrier signals are spaced at about 1.05 times of a symbol rate in a frequency domain, and wherein the symbol rate is dependent on a number of subcarrier signals and a number of data information per symbol for each subcarrier signal.

10. The optical receiver of claim 7, wherein the DSP unit is further configured to recondition the received digital signals.

11. The optical receiver of claim 7, wherein each digital signal comprises:
  an in-phase (I) component of a first polarization component of the optical signal;
  a quadrature-phase (Q) component of the first polarization component of the optical signal;
  an I component of a second polarization component of the optical signal; or
  a Q component of the second polarization component of the optical signal,
    wherein the first polarization component and the second polarization component are orthogonal.

12. The optical receiver of claim 7, wherein demultiplexing the digital signals into the subcarrier signals comprises separating the digital signals into the subcarrier signals in a time domain according to each subcarrier tone frequency and spectral shape.

13. The optical receiver of claim 11, wherein compensating CD for each subcarrier signal comprises:
  transforming each polarization component of the subcarrier signals into a frequency domain by applying a fast Fourier transform (FFT) module to each polarization component of the subcarrier signals;
  applying the CDC equalizer to each frequency transformed polarization component; and
  transforming each CD compensated polarization component into a time domain by applying an inverse FFT (IFFT) module to each CD compensated polarization component.

14. The optical receiver of claim 11, wherein demultiplexing the digital signals into the subcarrier signals comprises:
  transforming each polarization component into a frequency domain by applying a fast Fourier transform (FFT) module to each polarization component; and
  separating the frequency transformed polarization component into the subcarrier signals according to each subcarrier tone frequency and each subcarrier spectral shape,
    wherein compensating CD for each subcarrier signal comprises:
      applying the CDC equalizer to each polarization component of the subcarrier signals; and
      applying an inverse FFT (IFFT) module to each CD compensated polarization component.

15. A method for compensating for chromatic dispersion (CD) in an optical fiber communication system comprising:
  receiving a plurality of digital signals comprising symbol mapped data information carried in a plurality of spectrally shaped subcarrier signals;
  demultiplexing the digital signals into the subcarrier signals; and
  performing, using at least one N-point CD compensation (CDC) equalizer, a frequency domain equalization on each subcarrier signal,
    wherein N is a positive integer that is inversely proportional to a total number of the subcarrier signals.

16. The method of claim 15, wherein each subcarrier signal is associated with a unique tone frequency and a unique spectral shape.

17. The method of claim 15, wherein the spectrally shaped subcarrier signals are Nyquist shaped subcarrier signals spaced at about 1.05 times a symbol rate in a frequency domain, and wherein the symbol rate is dependent on a number of subcarrier signals and a number of the data information per symbol for each subcarrier signal.

18. The method of claim 16, wherein each digital signal comprises:
- an in-phase (I) component of a first polarization component of an optical signal;
- a quadrature-phase (Q) component of the first polarization component of the optical signal;
- an I component of a second polarization component of the optical signal; or
- a Q component of the second polarization component of the optical signal,
- wherein the first polarization component and the second polarization component are orthogonal.

19. The method of claim 18, wherein demultiplexing the digital signal into the subcarrier signals comprises:
- transforming each polarization component into a frequency domain signal by applying a fast Fourier transform (FFT) module to each polarization component; and
- separating the frequency domain signal into the subcarrier signals according to each subcarrier tone frequency and each subcarrier spectral shape,
- wherein performing the frequency domain equalization on each subcarrier signal comprises:
  - applying the CDC equalizer to each polarization component of the subcarrier signals to compensate for CD; and
  - applying an inverse FFT (IFFT) module to each CD compensated polarization component.

20. The method of claim 18, wherein demultiplexing the digital signal into the subcarrier signals is performed in a time domain according to each subcarrier tone frequency and each subcarrier spectral shape, wherein performing the frequency domain equalization on each subcarrier signal comprises:
- transforming each polarization component of the subcarrier signals into a frequency domain by applying a fast Fourier transform (FFT) module to each polarization component of the subcarrier signals;
- applying the CDC equalizer to each frequency transformed polarization component; and
- transforming each CD compensated polarization component into a time domain by applying an inverse FFT (IFFT) module to each CD compensated polarization component.

21. The optical transmitter of claim 1, wherein N is inversely proportional to a square of the total number of the subcarrier signals.

22. The optical transmitter of claim 1, wherein N is directly proportional to an amount of channel impairment.

23. The optical transmitter of claim 22, wherein the channel impairment comprises component impairment and fiber impairment.

24. The optical transmitter of claim 4, wherein the shaping filter is a Nyquist filter.

25. The optical transmitter of claim 1, wherein the subcarrier signals are spaced at about 1.05 times of a symbol rate.

26. The optical receiver of claim 7, wherein the subcarrier signals are non-overlapping in a frequency domain.

* * * * *